(12) United States Patent
Di Rosa et al.

(10) Patent No.: US 6,195,860 B1
(45) Date of Patent: Mar. 6, 2001

(54) WELDING ELECTRODE RESHAPING DEVICE

(75) Inventors: Gaetano Di Rosa, Pino Torinese; Sergio Cappa, Turin; Cristiano Rossi, Baldissero Torinese, all of (IT)

(73) Assignee: Fata Automation S.p.A., Pianezza (IT)

( * ) Notice: Subject to any disclaimer, the term of this patent is extended or adjusted under 35 U.S.C. 154(b) by 0 days.

(21) Appl. No.: 09/438,463

(22) Filed: Nov. 12, 1999

(30) Foreign Application Priority Data

Nov. 11, 1998 (IL) ............................... MI98A2444

(51) Int. Cl.⁷ ................... B23P 23/04; B23P 6/00
(52) U.S. Cl. ............... 29/33 R; 72/126; 451/65; 29/402.19
(58) Field of Search ................ 409/140, 138; 29/402.19, 33 R; 219/119; 72/126; 451/65, 68

(56) References Cited

U.S. PATENT DOCUMENTS

| | | | | |
|---|---|---|---|---|
| 2,286,931 | * | 6/1942 | Radeke | 407/31 |
| 2,300,173 | * | 10/1942 | Platz | 451/439 |
| 2,629,990 | * | 3/1953 | Tocci-Guilbert | 451/342 |
| 2,638,817 | * | 5/1953 | Hall | 407/33 |
| 2,930,289 | * | 3/1960 | Swarts | 407/34 |
| 3,498,008 | * | 3/1970 | Turner, Jr. | 451/344 |
| 3,504,514 | * | 4/1970 | Korson | 72/126 |
| 3,514,985 | * | 6/1970 | Marcovitch | 72/126 |
| 4,610,153 | * | 9/1986 | Nedorezov | 29/402.19 |
| 4,842,456 | * | 6/1989 | Saito | 409/140 |
| 4,856,949 | * | 8/1989 | Shimada | 409/140 |
| 5,288,185 | * | 2/1994 | Mattsson | 409/140 |
| 5,333,975 | * | 8/1994 | Nishiwaki | 409/140 |
| 5,505,655 | * | 4/1996 | Haffely et al. | 451/65 |
| 5,531,370 | * | 7/1996 | Rohrberg | 72/126 |
| 5,993,125 | * | 11/1999 | Shimada | 409/140 |

FOREIGN PATENT DOCUMENTS 3817225   11/1989  (DE).

* cited by examiner

Primary Examiner—A. L. Wellington
Assistant Examiner—Erica Ergenbright
(74) Attorney, Agent, or Firm—Jacobson, Price, Holman & Stern, PLLC

(57) ABSTRACT

A welding electrode dressing device in particular in automated welding stations comprises an electrode treatment head (11, 111) equipped with upsetting members (15, 115) which reshape the tip of an electrode inserted in it without removing material. Advantageously the treatment head (11, 111) comprises two treatment seats (19, 119) arranged on opposite sides thereof to each receive the end (12) of a pair of welding gun electrodes.

9 Claims, 4 Drawing Sheets

WELDING ELECTRODE RESHAPING DEVICE

BACKGROUND OF THE INVENTION

The present invention relates to a device for dressing welding electrodes and in particular in automatic welding stations.

It is known that the electrodes which make contact with the sheet metal to be welded are the consumable part of a resistance welding system. For reasons of conductivity and contact resistance the electrodes must be made of nearly pure copper which is well known to be a ductile and malleable material. During use the electrodes are subject cyclically to high pressures with high temperatures and undergo a plastic deformation process which changes their shape to the detriment of welding quality. To limit deterioration of quality beyond acceptable limits in practice devices termed electrode dressers which periodically mill the upset material with small shaped milling cutters to restore the original shape of the electrode tip are used.

Since the dressers work by material removal they can only intervene a small number of times. The dressing operations are therefore spaced in time and between one operation and the next the quality of the welding tips undergoes progressive deterioration to the limit of acceptability. However, the dressers removing material shorten considerably the useful life of the electrodes with resulting increase in operating costs.

The general purpose of the present invention is to overcome the above mentioned drawbacks by making available a dressing device which could be used frequently with optimal results and without limiting the useful life of the electrodes.

SUMMARY OF THE INVENTION

In view of this purpose it is sought to provide in accordance with the present invention a device for welding electrode dressing in particular in automated welding stations and comprising an electrode treatment head fitted with upsetting members which reshape the electrode tip inserted in it without removing material.

BRIEF DESCRIPTION OF THE DRAWINGS

To clarify the explanation of the innovative principles of the present invention and its advantages compared with the prior art there are described below with the aid of the annexed drawings possible embodiments thereof by way of non-limiting examples applying said principles. In the drawings.

DETAILED DESCRIPTION OF THE INVENTION

Figure 1:
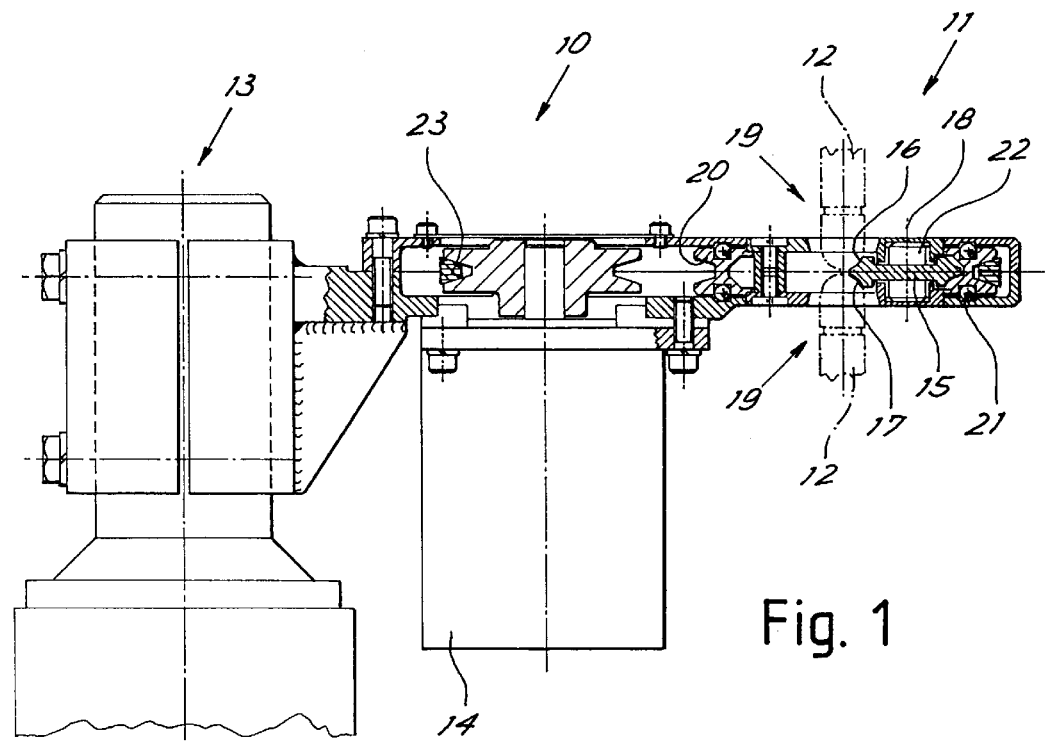
FIG. 1 shows a diagrammatic side view partially cross sectioned along plane of cut I—I of FIG. 2 of a device in accordance with the present invention.

With reference to the figures FIG. 1 shows a reshaping device indicated as a whole by reference number 10 comprising a treatment head 11 for dressing electrodes 12 of a robotized welding gun. The gun is not shown nor described here since it is essentially prior art. This gun can be part of an automated welding station where a plurality of robotized arms perform processing on an object such as for example an automobile body. The device 10 is supported by a support 13 appropriately arranged in the station so that the robotized arms can carry the electrodes and grasp the treatment head on the two sides.

An electric motor 14 drives upsetting members 15 located in the treatment head to do the electrode tip upsetting by exploiting the malleability and ductility of the material making up the electrodes. The upsetting members have a shape such as to define an upsetting seat 16, 17 for each electrode of the gun with the seat being shaped as desired for the electrode tip.

Figure 2:
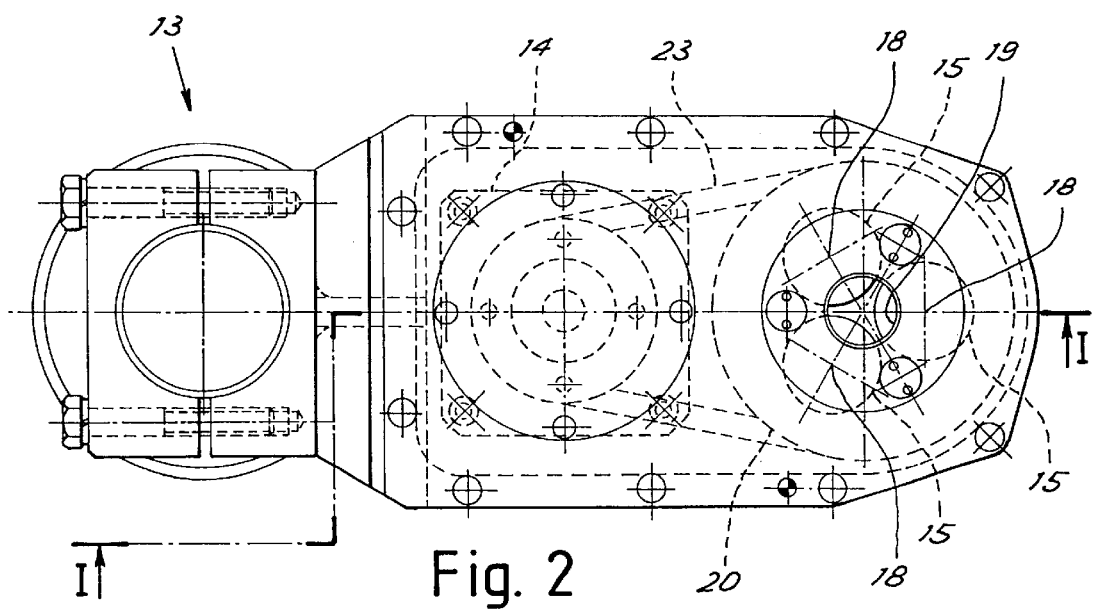
FIG. 2 shows a plan view of the device of FIG. 1.

As may be seen also in FIG. 2 in the embodiment described the upsetting members are made in the form of three satellites 15 with periphery shaped with seats 16 and 17. The satellites are arranged with rotation axis 18 at the vertices of an equilateral triangle to face each other opposite an opening 19 for introduction of the electrode tip in the reshaping device. The satellites 15 are supported by means of their own plain bearings 22 by a satellite holder 20 having bearings 21 supporting the body of the device.

The satellite holder 20 is rotated by the motor 14 by means of a drive belt 23.

In use after a predetermined number of welds or even a single weld the welding gun closes on the head 11 so as to arrange the electrodes with the tips as shown in FIG. 1. Rotation of the satellite holder and consequently of the satellites around the electrode tips perform the upsetting of the tips to reshape them in the original shape. It should be noted that the flat shape of the upsetting head 11 makes it perfectly compatible with the normal openings of welding guns.

Figure 3:
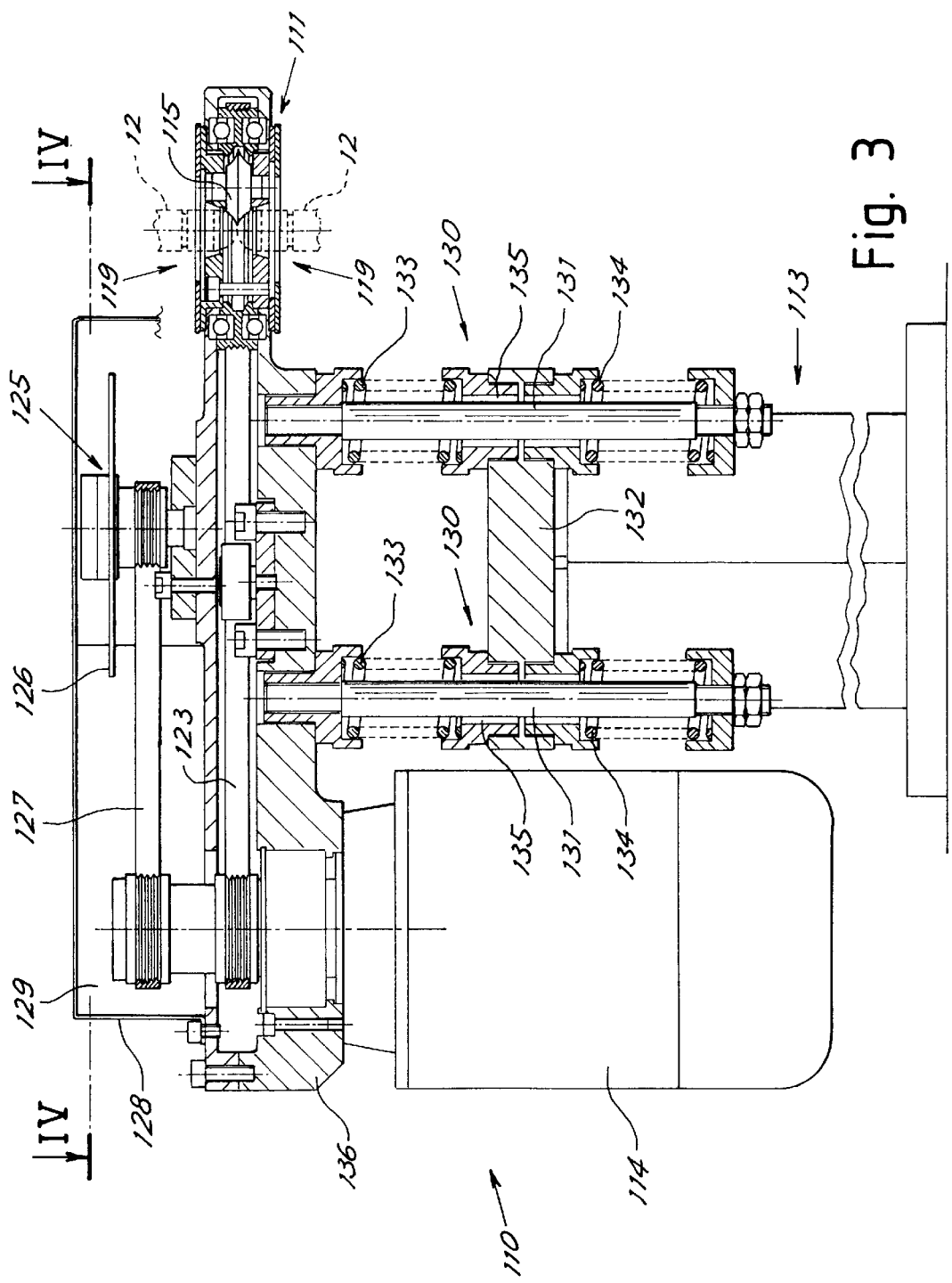
FIG. 3 shows a side elevation view cross sectioned along plane of cut III of FIG. 4 of a possible variant of the device in accordance with the present invention.

FIG. 3 shows a second embodiment of a device in accordance with the present invention. For the sake of convenience details similar to those of the above embodiment are indicated by the same numbering increased by 100.

The device of FIG. 3 indicated as a whole by reference number 110 comprises a treatment head 111 for dressing the electrodes 12 and is supported by a support 113.

Differently from the device 10 the device 110 is supported in an intermediate position between its ends with the motor 114 arranged overhanging on the side opposite the treatment head. The motor 114 drives through a belt 123 upsetting members 115 located in the head 111.

The upsetting head 111 is essentially similar to the head 11 described above to perform upsetting of the electrodes inserted in an opposing manner therein through the openings 119.

Advantageously as may by seen in FIG. 3 the support for the device 110 is sprung by means of a spring units 130 and comprises pins 131 integral with the body 136 of the device 110 and running in seats 135 made in a plate 132 of the support 113. On the two sides of the plate 132 are located springs 133, 134 each reacting between one end of the respective pin and the plate itself so as to provide a 2-way elastic support in the direction of thrust of the electrodes against the device. This elastic support allows the device to move adequately under the thrust of the welding guns which are brought into contact with the two processing heads.

In addition to the upsetting head 111 the device 110 has a second processing head or cleaning head indicated generally by reference number 125. This second head 125 comprises a tool 126 designed for performing surface cleaning with negligible material removal. The tool is powered by the motor 114 through a second belt 127.

The tool can be for example in the form of a lightly diamond-coated abrasive or some other tool suitable for the purpose for example with an appropriate cutting edge.

Figure 4:
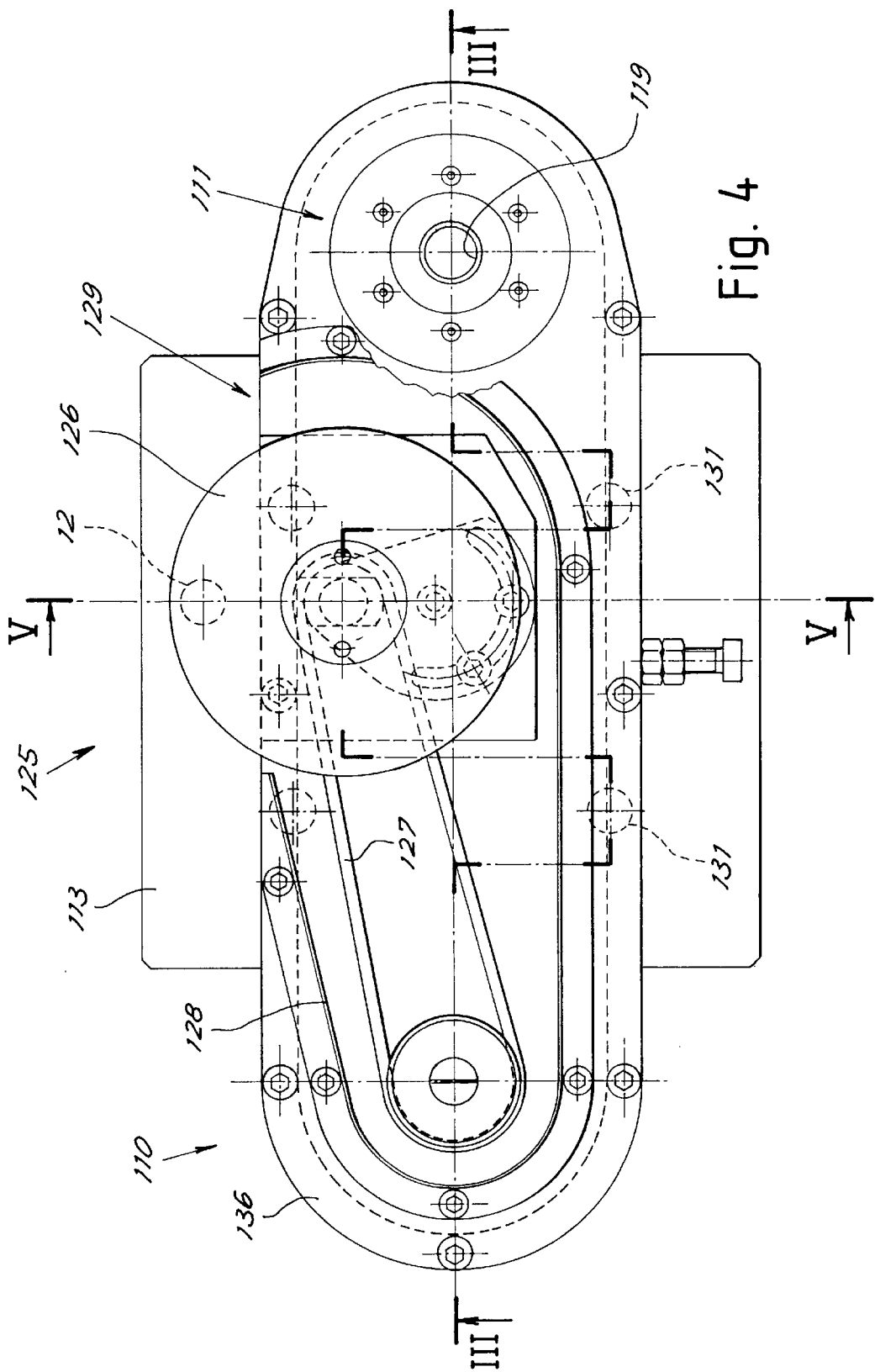
FIG. 4 shows a plan view cross sectioned along plane of cut IV—IV of FIG. 3.

As may be seen in FIG. 4 the tool 126 projects from a protective hood 128 through an opening 129 so that the pair of electrodes 12 of one gun can rest on the work surface of the tool 126.

Thus it is possible to perform cleaning of the electrode end which is a slightly flattened area (termed 'lens') remaining despite the action of the reshaping rollers. In this area are fixed oxides, zinc slag and the like which alloy with the metal of the electrodes and reduce passage of electrical current with resulting reduction of weld quality.

Advantageously the tool can be configured to maintain a slight curvature of the lens. This can be easily obtained with a tool shaped from a soft 'floating' disk or from a brush.

Figure 5:
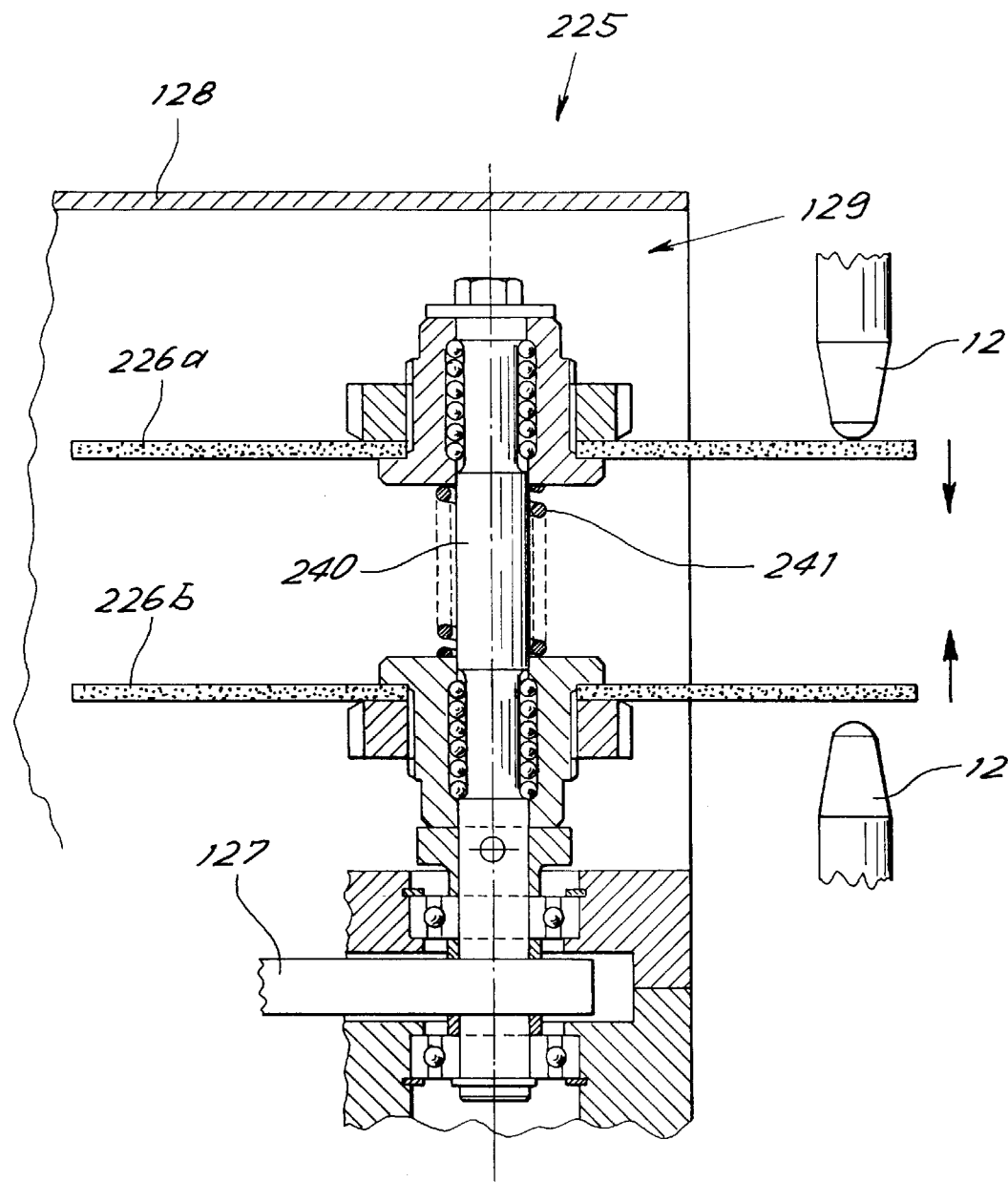
FIG. 5 is a scrap view of another variant of the device of FIG. 3.

Bearing of the disk tool can take place first for one electrode and then for the other or simultaneously for both electrodes by partial closing of the gun on the disk. In the latter case it is necessary to check the gun closing force to have the right pressure necessary for smoothing. FIG. 5 shows a variant of the smoothing head indicated as a whole by reference number 225. In this variant the head 225 comprises two cleaning disks 226a, 226b mounted and keyed in a running manner on a shaft 240 rotated by the belt 127. Between the two disks is arranged a spring 241 which pushes them apart.

The two electrodes draw near to the two disks from opposite directions and each electrode rests on the work surface of one of the two disks.

Support can take place first for one electrode and then for the other or simultaneously by partial closing of the gun. The support force of the electrode on the disk is determined by the spring 240. It is thus easy to supply a predetermined support force even allowing for the variability of positioning of the electrode tip which also depends on consumption of the electrode due to welding work.

It is now clear that the preset purposes have been achieved. As no material is removed the possible number of operations on one electrode is theoretically unlimited and at each welding cycle the electrode appears practically like new with assured quality for the entire cycle. The useful life of the electrodes is considerably prolonged with considerable cost savings.

Even using the cleaning head, material removal is negligible since this head basically only removes the superficial oxides and does not reshape the electrode.

As another advantage, with assurance of welding tip quality it will be possible to reduce the quantity of redundant tips normally applied to the object being welded with resulting advantages in production times and costs.

Lastly, no chips which must be removed from the processing area are produced.

Naturally the above description of embodiments applying the innovative principles of the present invention is given by way of non-limiting examples of said principles within the scope of the exclusive right claimed here.

For example shapes and proportions of component parts of the device can vary with specific needs.

What is claimed is:

1. A welding electrode dressing device, comprising:

at least one electrode treatment head equipped with an upsetting seat for housing a welding tip of an electrode to be dressed;

upsetting members for reshaping the welding tip of said electrode housed in the upsetting seat without removing material, the upsetting members consisting of a plurality of satellites, whose peripheries are shaped for the desired upsetting and whose mutually facing portions define said upsetting seat for the welding tip of the electrode, said plurality of satellites being supported by a satellite holder surrounding the upsetting seat and rotated by a motor to move the satellites around an axis said upsetting seat.

2. The device in accordance with claim 1, wherein the at least one electrode treatment head comprises:

at least two treatment seats arranged on opposite sides of the at least one treatment head and each of said at least two treatment seats is for receiving an end of an electrode of a pair of electrodes of a welding gun.

3. The device in accordance with claim 1, comprising:

a cleaning treatment head with a cleaning tool for cleaning ends of electrodes brought into contact therewith.

4. The device in accordance with claim 3 wherein the cleaning tool comprises at least one rotating abrasive disk.

5. The device in accordance with claim 3, wherein the cleaning tool comprises:

at least two parallel disks mounted to slide on a rotation shaft, said rotation shaft positioned between the at least two parallel disks, and a thrust spring positioned on the shaft to provide a spring sliding support for the at least two parallel disks.

6. The device in accordance with claim 1 wherein a ground support is arranged in an intermediate position between the motor and the at least one head.

7. The device in accordance with claim 6, wherein the ground support further comprises: at least two pins for constraining to the device, and said pins running in seats in the support;

at least two mutually opposing thrust springs being fitted on each said at least two pins to supply a 2-way spring support.

8. The device in accordance with claim 1, wherein a ground support is positioned on said device and includes a means for supporting a spring.

9. The device in accordance with claim 1, wherein said plurality of satellites supported by the satellite holder consists of three rotating satellites, whose rotation axes are at the vertices of an equilateral triangle centered on the axis of said upsetting seat for the welding tip of the electrode.

* * * * *